(12) United States Patent
Ang et al.

(10) Patent No.: US 11,680,695 B1
(45) Date of Patent: Jun. 20, 2023

(54) ANTI-GLARE FILTER FOR ILLUMINATION SYSTEMS, INCLUDING LED LIGHTING SYSTEMS

(71) Applicant: Luminit LLC, Torrance, CA (US)

(72) Inventors: Anthony Ang, Long Beach, CA (US); Mitch Jansen, Palo Alto, CA (US); Balvinder Gogia, Torrance, CA (US)

(73) Assignee: Luminit LLC, Torrance, CA (US)

( * ) Notice: Subject to any disclaimer, the term of this patent is extended or adjusted under 35 U.S.C. 154(b) by 0 days.

(21) Appl. No.: 17/837,988

(22) Filed: Jun. 10, 2022

(51) Int. Cl.
*F21V 5/00* (2018.01)
*F21S 8/04* (2006.01)
*F21V 3/04* (2018.01)
*F21Y 115/10* (2016.01)

(52) U.S. Cl.
CPC ............ *F21V 5/005* (2013.01); *F21S 8/04* (2013.01); *F21V 3/049* (2013.01); *F21V 5/008* (2013.01); *F21Y 2115/10* (2016.08)

(58) Field of Classification Search
CPC .......... F21V 5/005; F21V 5/008; F21V 3/049; F21S 8/04
See application file for complete search history.

(56) References Cited

U.S. PATENT DOCUMENTS

| | | | |
|---|---|---|---|
| 6,443,579 B1 | 9/2002 | Myers | |
| 7,450,799 B2 | 11/2008 | Selbrede et al. | |
| 9,086,521 B2 | 7/2015 | Rinehart et al. | |
| 2005/0041311 A1 | 2/2005 | Mi et al. | |
| 2014/0055859 A1 | 2/2014 | Vasylyev | |
| 2014/0376220 A1* | 12/2014 | Shen | B29D 11/0074 362/339 |
| 2017/0146214 A1* | 5/2017 | Purchase | F21V 5/005 |
| 2019/0346615 A1 | 11/2019 | Johnson et al. | |
| 2021/0247035 A1* | 8/2021 | Lim | F21V 5/002 |
| 2021/0389505 A1 | 12/2021 | Ang et al. | |

FOREIGN PATENT DOCUMENTS

WO  WO-2015184456 A1 * 12/2015  ............. F21S 8/026

OTHER PUBLICATIONS

Merriam-Webster, "Frustum Definition & Meaning", Aug. 8, 2022, Internet/On-Line Search, https://www.merriam-webster.com/dictionary/frustum, pertinent passage "Definition of frustum: the basal part of a solid cone or pyramid formed by cutting off the top by a plane parallel to the base".*
Krabbenborg, Sven O., "Roll-to-Roll Manufactured Structure Foils for Interior and Exterior Applications", BASF, Feb. 24, 2021, 23 pgs.
"Optics Data Sheet: CDP Conical De-glaring Prism", Jungbecker Enlightening Solutions, https://materials-direct.com/wp-content/uploads/2019/08/Jungbecker_CDP_Standard_Produkte_1_Klasse_A4_E.pdf, Aug. 2019, 2 pgs.

* cited by examiner

*Primary Examiner* — Alan B Cariaso
(74) *Attorney, Agent, or Firm* — Patent Law Works LLP

(57) ABSTRACT

An anti-glare film for a light source is disclosed. The light source may be a light source with a Lambertian distribution, such as an LED light source. The anti-glare film may include a micro-frustum array to reduce the angular distribution of the light source and thus reduce glare. In some implementations, anti-glare film may further include a light shaping diffuser.

16 Claims, 15 Drawing Sheets
(14 of 15 Drawing Sheet(s) Filed in Color)

ANTI-GLARE FILTER FOR ILLUMINATION SYSTEMS, INCLUDING LED LIGHTING SYSTEMS

FIELD OF THE INVENTION

The present disclosure generally relates to reducing the glare of illumination light sources, including LED light sources.

BACKGROUND

Light Emitting Diode (LED) light sources have become increasingly popular for applications such as room illumination. However, as LED light sources have gotten brighter, glare from lighting fixtures has become an increasing problem.

The light output from an overhead LED light source can have a large angular distribution (e.g., a Lambertian distribution). This can cause discomfort to surrounding viewers. Ideally, the light from a light source comes down in a range of angles that provides comfortable illumination for viewers under the light source but doesn't create uncomfortable glare for people in an adjacent area. For example, an overhead LED room light for illuminating a room (e.g., a dining room) may create glare for people in a nearby area (e.g., an adjacent hallway or adjacent room).

For example, in a ceiling-mounted light fixture, lighting designers attempt to provide a far-field illumination pattern that fills a desired space with an even illumination pattern. For ceiling mounted light fixtures, light exiting the luminaire in a downward direction (perpendicular to the ceiling and floor) provides a far-field illumination that is desirable for achieving usable lighting. However, light at angles between 60-85° from vertical, are less desirable, since this light contributes little to illumination in the vicinity of the fixture, and also contributes to glare that may be annoying or distracting.

Glare can cause discomfort. But it can also create a hazard in some situations. For example, the glare from a bright light source can interfere with people's ability to see obstacles and thus creates a potential safety issue. For example, in an outdoor lighting system to illuminate a parking lot, glare does not just cause discomfort to car drivers but can create a safety hazard if the glare renders them temporarily incapable of seeing pedestrians. There are some applications in which glare can be a potential safety hazard.

Many of the proposed solutions for glare from light sources having a wide angular distribution create high optical losses. For example, one solution is to use an acrylic cover with a frosted surface to hide the light source and minimize glare, but this solution results in high light loss. Many of the proposed solutions for reducing glare from LED light sources create high optical losses, which is undesirable in terms of efficiency and viewing comfort.

SUMMARY

The present disclosure relates to systems and methods for reducing glare from an illumination source having a broad angular distribution, such as a Lambertian distribution. In one implementation, an anti-glare filter (AGF) is patterned in a film. The AGF reduces the angular distribution of light output from the film. In one implementation, the AGF comprises an array of frustums. The film has a first side facing a light source and a second side that allows light emission. The frustums are formed on the second side of the film. The frustums have sloped sidewalls that act, through Snell's law and Fresnel equations, to narrow the angular distribution of light output from the AGF. The size, shape, depth, and slope of each frustum may be optimized in an array to reduce glare but achieve a high effective transmissivity of the AGF.

A light shaping diffuser (LSD) may be formed on the first side of the film to perform light shaping operations such as improving homogeneity, reducing hot spots, improving the roundness or ellipticity of the light (depending on application), improving transmissivity, etc. The LSD may, for example, comprise a surface relief structure including pseudo-random, non-periodic structures. The LSD may also be formed on the second side with the AGF.

A film having an AGF and LSD function may, for example, reduce glare without sacrificing high transmissivity and other desirable optical properties of an illumination light source. Thus, high efficiency of a light system, such as an LED lighting system, may be achieved, consistent with a reduction in glare.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure is illustrated by way of example, and not by way of limitation in the FIGS. of the accompanying drawings in which like reference numerals are used to refer to similar elements.

DETAILED DESCRIPTION

The present disclosure describes an apparatus, system and method for reducing glare of light illumination sources having a wide angular distribution of light. This includes light sources with a Lambertian light distribution (i.e., a distribution of light which scatters from a surface with an intensity proportional to the cosine of the output angle), including LED light sources.

Figure 1A:
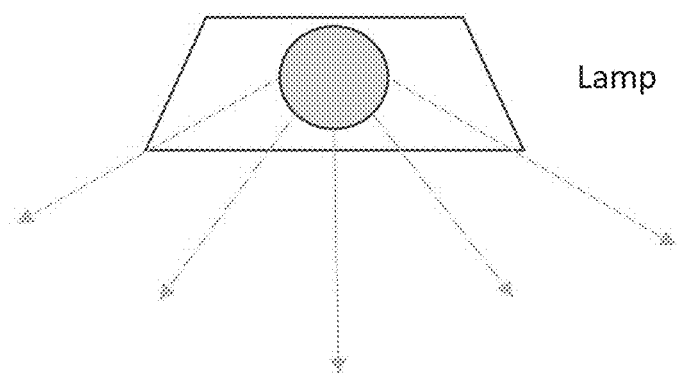
FIG. 1A illustrates a conventional illumination system with a broad angular distribution.
Figure 1B:
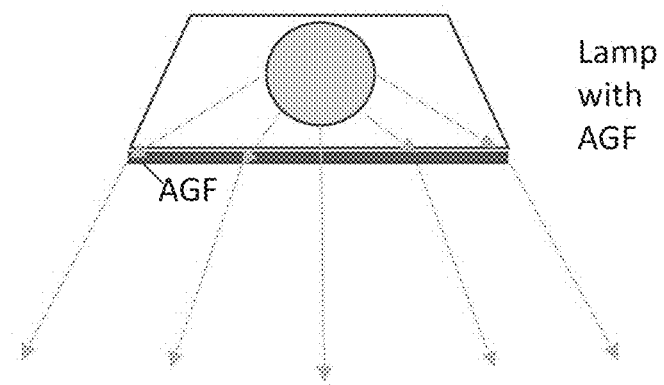
FIG. 1B illustrating the light output of the illumination system of FIG. 1A with the additional of an anti-glare filter.

Referring to FIG. 1A, in a conventional overhead light source, such as an LED light source, there is wide angular distribution of light. As illustrated in FIG. 1B, an anti-glare film (AGF) narrows the angular distribution.

Figure 2:
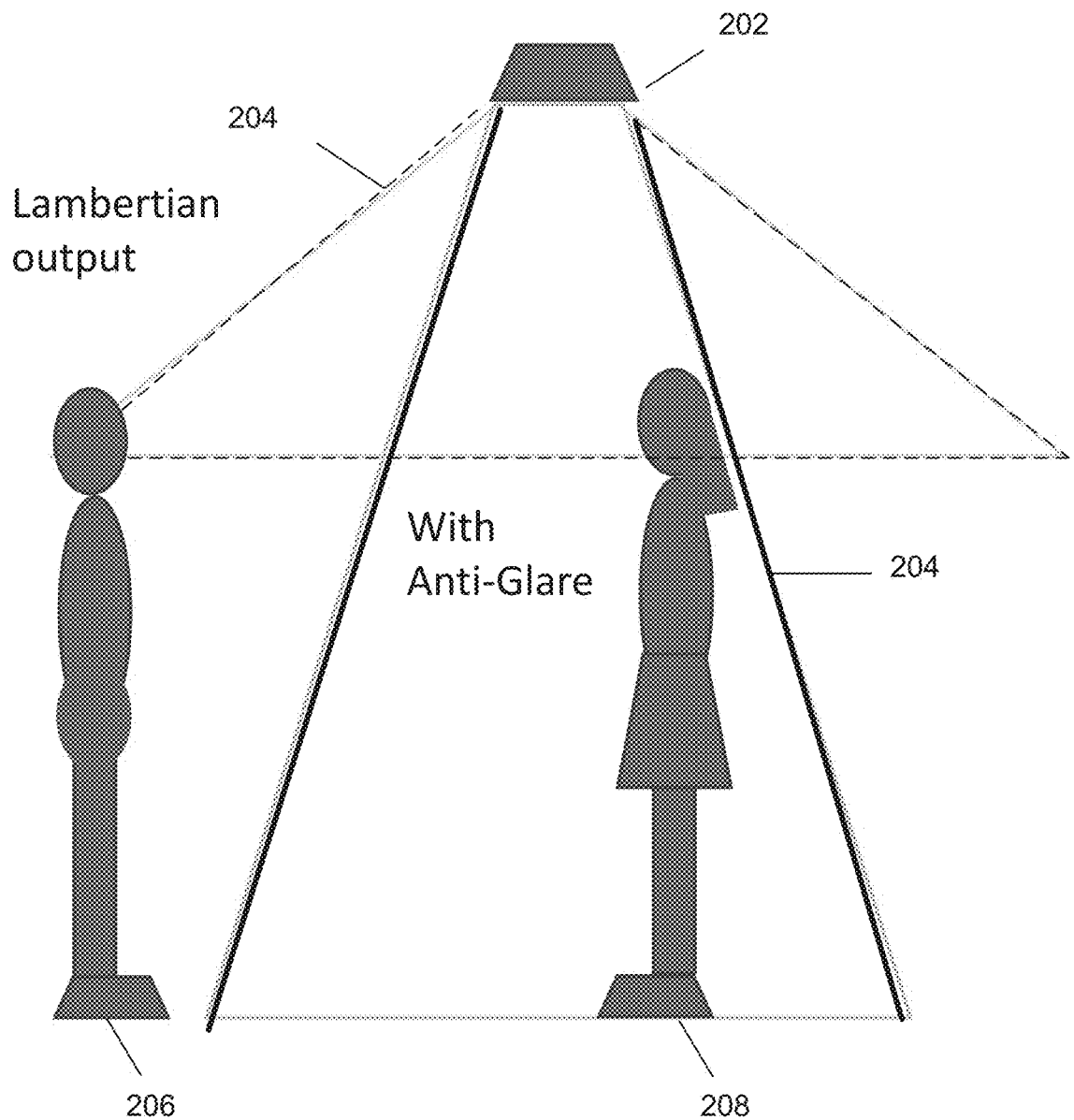
FIG. 2 illustrated how the illumination system of FIG. 1A generates unwanted glare in the eyes of an adjacent person not directly under the light source and how the reduction in angular distribution created by an anti-glare filter reduces glare.

As illustrated in FIG. 2, the properties of the AGF may be selected to achieve high transmissivity of light while also narrowing the angular distribution in a beneficial way such that the light source illuminates intended directions but that light in unintended directions is reduced. Light source 202, such as an LED light source, produces a Lambertian output 204 which may create glare for a nearby person 206. However, with an AGF, the light output 204 is narrowed. Thus, a person 208 under the light gets the benefit of light from light source 202, but a nearby person 206 does not suffer from glare.

The AGF may be fabricated by forming a set of microfeatures on a transparent film with the microfeatures including slopped surfaces that refract light entering the AGF into a narrower range of angles. This can include some fabrication aspects similar to those of privacy filters for computer displays but with additional modifications made for different purposes and functions. There are techniques to narrow the light distribution from electronic display screens of laptop computer to increase privacy, but these techniques often increase glare for non-primary viewers. For example, a privacy filter is described in Applicant's co-pending published patent application U.S. 2021/0389505, App. No. 16/899,062 "Anti-Glare, Privacy Screen For Windows Or Electronic Device Displays" by Anthony Ang, et al., the contents of which are hereby incorporated by reference. In Applicant's co-pending patent application U.S. 2021/0389505, the light output from a display screen of a laptop computer has a privacy filter attached to the display screen. The privacy filter has an array of microfeatures formed in a film that results in a narrower range of viewing angles such that only a primary user directly facing the display screen of the laptop computer will be able to view text and drawings on the display screen. Secondary viewers viewing from other angles (e.g., someone sitting to the side of the user of the laptop computer) will experience increased glare from background room illumination. The privacy filter has an array of microfeatures to redirect light. However, to implement a privacy filter for an electronic display of a laptop computer, the micro feature pitch of the privacy filter must match the pixelization pattern of the display screen.

The inventors of the current application have recognized that the technology underlying privacy filters can be modified, adapted, and applied to the fundamentally different problem of illumination systems in which the light source has a broad optical distribution, such as an overhead LED lighting solution. For an illumination light source, such as an overhead LED lighting source, there is no need to match the micro feature pitch to a pixelization pattern. There is also more freedom to fabricate microfeatures to reduce an angular distribution of light emitted from a light source.

Figure 3A:
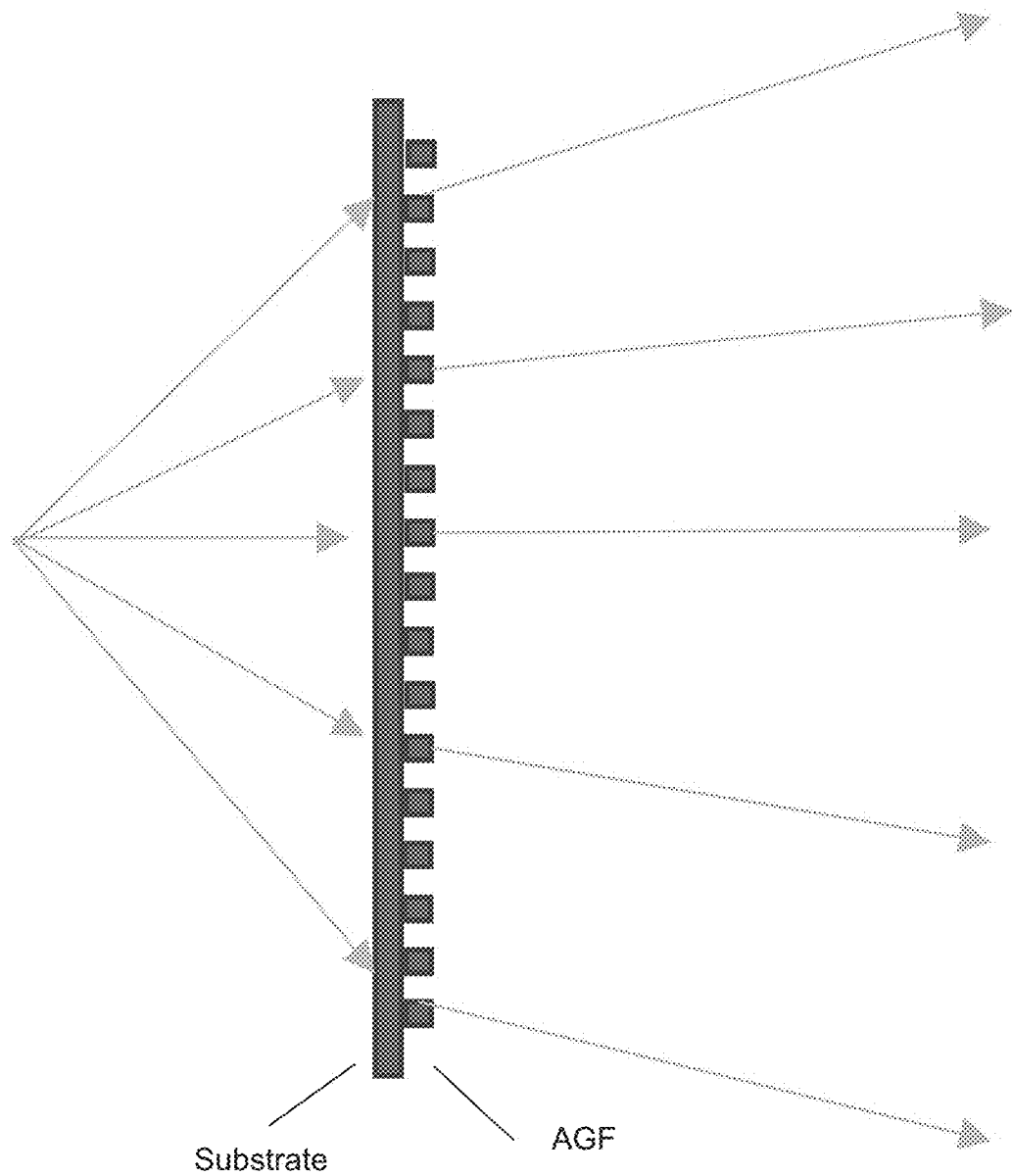
FIG. 3A is a simplified side view showing an anti-glare filter implemented as an array of microstructures to reduce the angular distribution of an input light source.
Figure 3B:
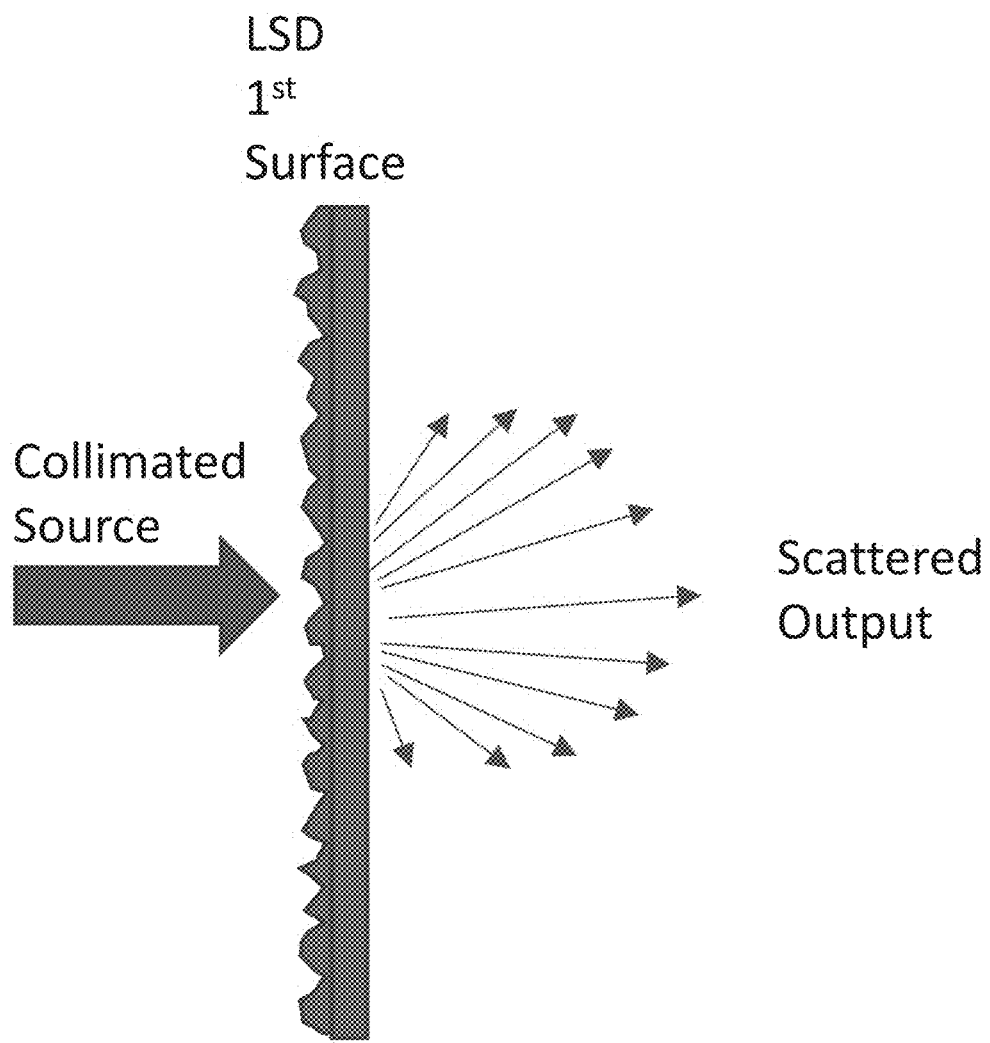
FIG. 3B is a simplified side view of a light shaping diffuser.

The AGF may be patterned into a thin film that is highly transparent. However, more generally, the AGF may be formed in a thin film and bonded to a supportive transparent substrate. Alternatively, the AGF may be formed on surface of a rigid or semi-rigid transparent substrate. Referring to FIG. 3A, the AGF may be formed as a microstructure on a second side of a film on the side the light exits from, as illustrated in FIG. 3. For example, the microstructure may be a pattern in the surface of a transparent film to create variations in the index of refraction that narrow the optical distribution. This may include, for example, a sequence of angled sidewalls in the microstructures to deflect light rays in a manner selected to narrow the angular distribution of an input light source, such as a light source having a Lambertian distribution.

The microstructure pattern to implement an AGF may be determined in a variety of ways. For example, optical ray tracing calculations may be used to determine general microstructure parameters to beneficially redirect light. This may include, for example, taking into account the refractive indices at issue, the slopes of sidewalls of microstructure, the depth of microstructure sidewalls, and any other parameters influencing how light is redirected by the AGF. Additionally, empirical optimizations may be performed taking into account issues of manufacturability. That is, the microstructure design may be empirically optimized to achieve a desired narrowing of the angular distribution of a light source, such as an LED light source having a Lambertian distribution.

As illustrated in FIG. 3A, a $1^{st}$ surface may include a light shaping diffuser (LSD). An LSD may be formed by a surface relief pattern that scatters light via a geometrical tilt of the surface normal and Snell's law of refraction. An LSD scatters collimated light, but more generally can be used to provide a variety of functions such as increasing transmissivity, homogenizing the light output, reducing optical hot spots, creating a more circular (or, if desired, elliptical) output, etc. As one example, an LSD may, for example, comprise a surface relief structure including pseudo-random, non-periodic structures selected to perform functions such as homogenizing the light output. While the LSD may be formed on the first side, more generally as described below there are also ways it may be implemented in combination with the AGF on the second side.

Figure 4:
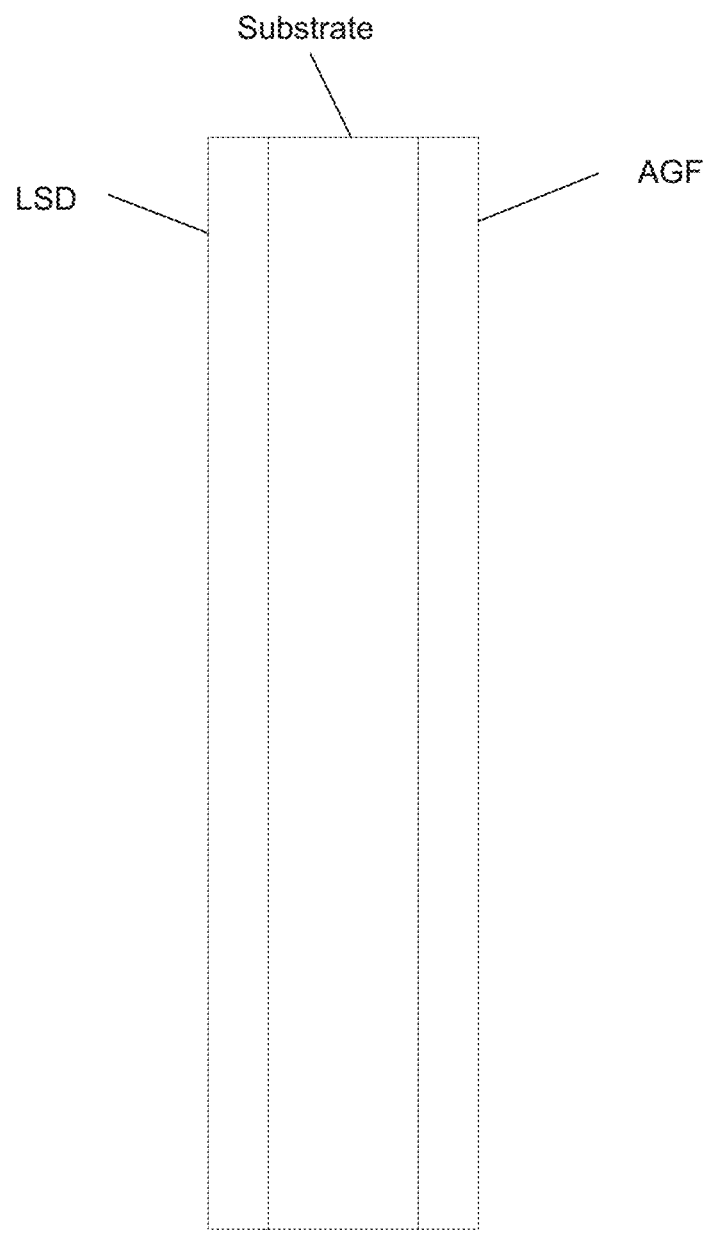
FIG. 4 is a simplified side view illustrating that an optical element may include both a light shaping diffuser and an ant-glare filter.

Referring to FIG. 4, forming an LSD on a first side of a film and an AGF on a second side of a film supports not just reducing glare, but also supports reducing glare while also improving other aspects of the light output, such as increasing transmissivity, homogenizing the light output, etc. The AGF thus may be implemented as a two-sided film formed on transparent thin film plastic substrate (e.g., polycarbonate (PC) or polyethylene (PE)). However, more generally other types of transparent substrates could be used, such as rigid plastics, glass, injection molded plastic (with 3D features), silicones (with 3D features), etc. In some implementations, the AGF and LSD are formed on a single thin film substrate. However, more generally the AGF and LSD could be transferred to a transparent support substrate. That is, there is more than one possible fabrication technology.

The AGF may be formed in several different ways. In one implementation, the AGF includes an array of frustums or frustum rings, which are described below in more detail. A master process may include, for example, image writing or diamond turning. The fabrication tools for forming a master may include an image writer (e.g., a Heidelberg Instruments image writer) and diamond turning. Sub-mastering may include step and repeat to expand the area of coverage. In some implementations, the LSD may be formed using an analog holographic set up or an image writer.

The AGF is highly manufacturable and may be implemented on wide role-to-role films. This permits low cost manufacturing, which is important for many lighting applications. The AGF films may be used for a variety of light sources, such as light bulbs, downlights, linear lights, troffers, stadium lights, high bay lights, automotive lights, etc. Potential applications include office applications, home applications, stage applications, refrigeration applications, museum applications, stadium applications, etc.

Additional details about the AGF design and optical properties will now be described.

Figure 5:
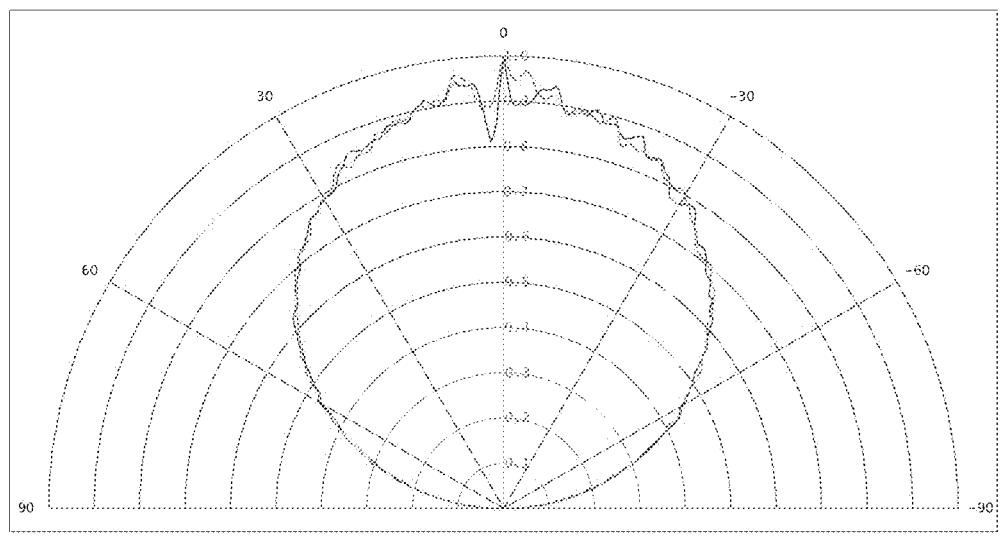
FIG. 5 illustrates a light source having a Lambertian distribution.

FIG. 5 illustrates an angular plot of luminous (radiant) intensity for an example of a Lambertian distribution, such as a bidirectional scatter distribution function (BDSF) that might be output from LED light sources. As can be seen, the radiant intensity is still quite high beyond 60 degrees (around 0.45 of the maximum at ±60 degrees, and around 0.2 of the maximum at ±75 degrees). This sort of Lambertian distribution can result in glare from LED lighting fixtures to surrounding viewers..

Figure 6A:
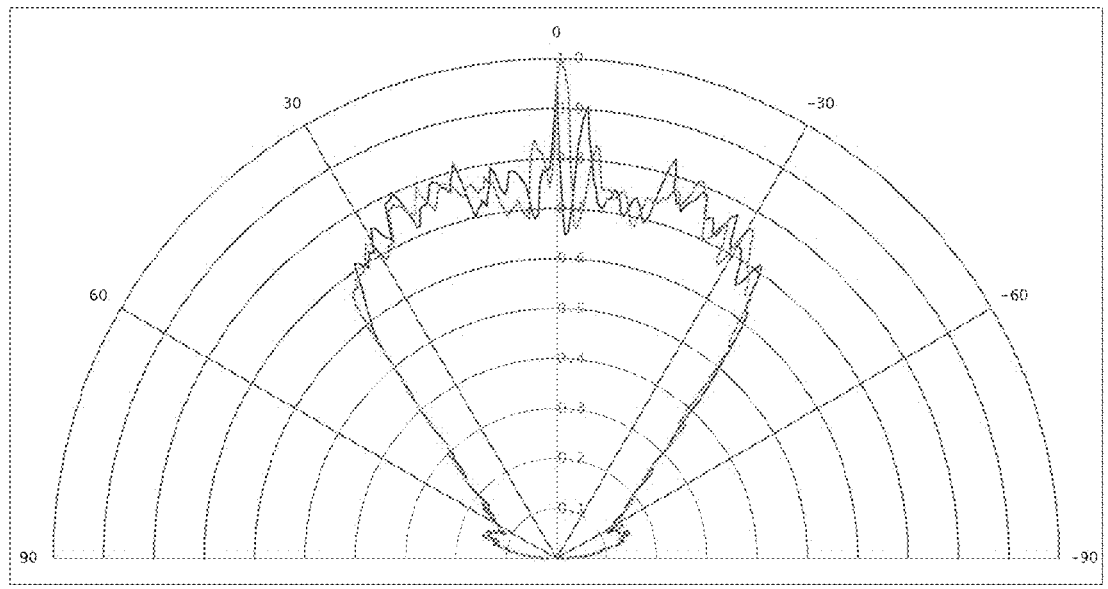
FIG. 6A illustrates a polar graph of the optical output after passing through the ant-glare filter.
Figure 6B:
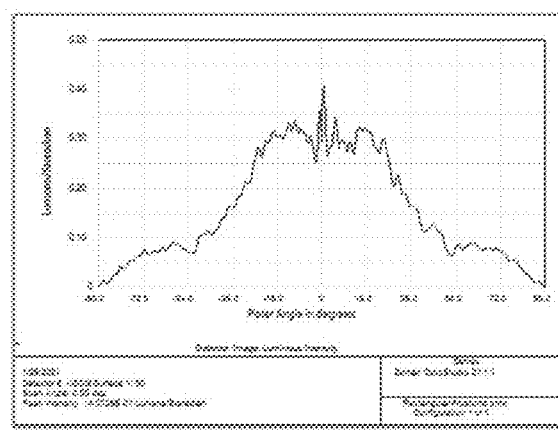
FIG. 6B illustrates a slice plot of the light output of a source having a Lambertian distribution after passing through an anti-glare filter.

FIG. 6A illustrates the output of a Lambertian distribution light source after it passes through the AGF formed from an array of frustums. FIG. 6B is a polar plot of the optical distribution. In this example, the optical distribution at higher angles has been dramatically narrowed in comparison to the Lambertian distribution of FIG. 5. The amount of energy at angles greater than 60 degrees is dramatically less than in the Lambertian distribution of FIG. 5. In FIG. 6A, at 60 degrees, the radiant intensity is below 0.15 of maximum.

The plots of FIGS. 6A, and 6B illustrate that AGFs can be fabricated that dramatically reduce the optical energy at angles likely to create glare for surrounding viewers.

In one implementation, the AGF is implemented as an array of Frustums, where each Frustum is a chopped section of cones or pyramids. That is, in accord with conventional definitions, each frustum is a portion of a cone or pyramid which remains after its upper part has been cut off by a plane parallel to its base, or that is intercepted between two such planes. The easiest frustum shapes to fabricate sections of simple pyramids with a square based or section of cones with a circular base.

Figure 7A:
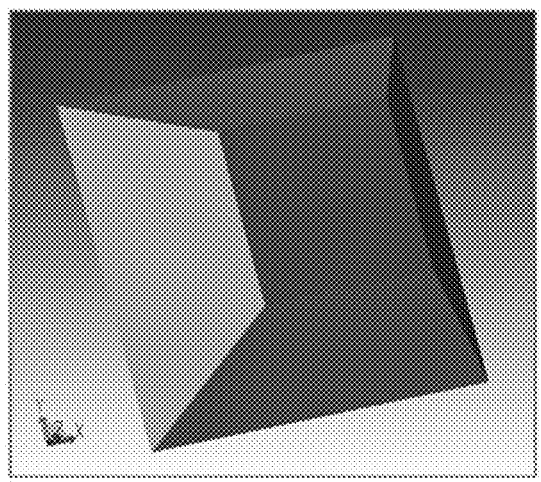
FIG. 7A illustrates an idealized frustum that is a section of a pyramidal shape.
Figure 7B:
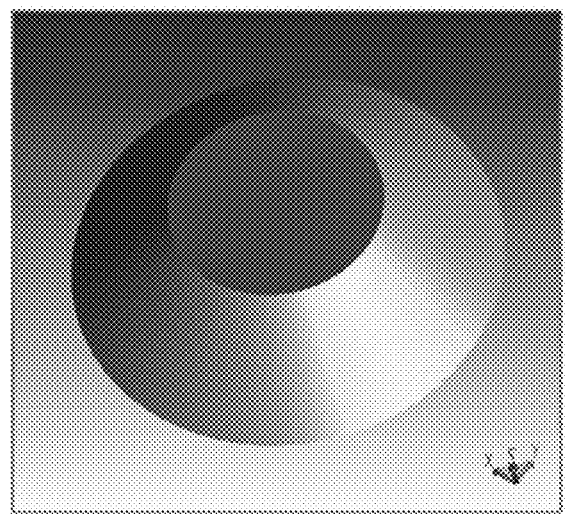
FIG. 7B illustrates an idealized frustum that is a section of a conical shape.

FIG. 7A illustrates an example of a single Frustum element with a square base and FIG. 7B illustrates a cone shaped Frustum with a circular base.

Individual frustums may be implemented with different levels of steepness and different base geometries. For example, pyramid-shaped Frustums have N-sides, where N is at least 3. The base geometry may be squares or rectangles (for pyramids) or circles or elliptical bases (for cones). Each frustum acts like a micro-lens.

An array of frustums can repeat in shape and location in an orderly pattern. For example an array of frustums (a Micro Frustum Array (MFA)) can be implemented in an array having a rectangular, square, hexagonal, or asymmetric hexagonal array pattern. The heights of the microstructure is restricted by the fabrication process of making a surface relief master. For example, the microstructures can be imprinted on various types of optical substrate types, replicated from various mastering processes known in the industry. An element of randomization may be implemented if desired.

Figure 8A:
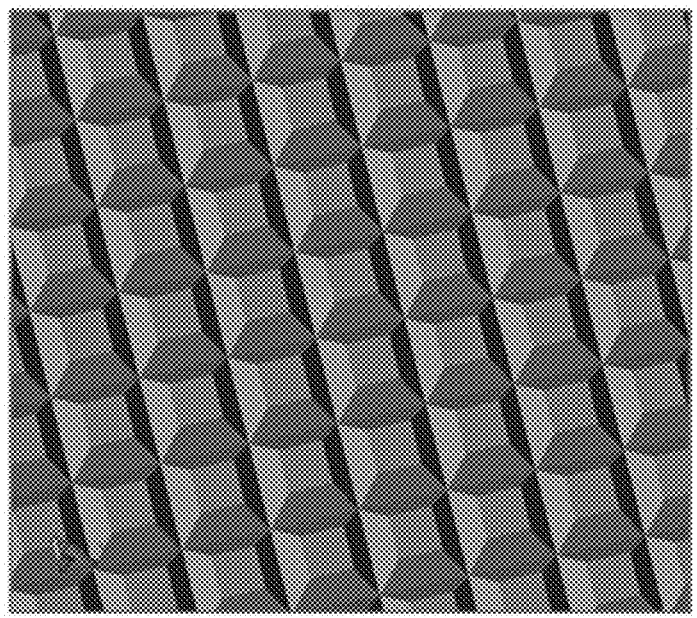
FIG. 8A illustrates an example of a micro-frustum array have a square pyramidal shape.
Figure 8B:
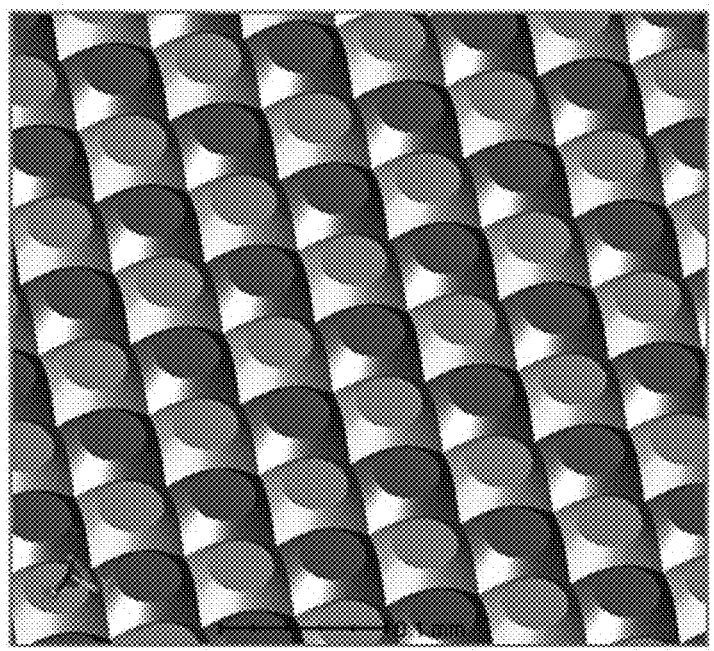
FIG. 8B illustrates an example of a micro-frustum array have a conical shape.

FIGS. 8A and 8B illustrate examples of frustums in a square array pattern. These examples illustrate two different frustum shapes (e.g., square cut-off pyramids vs. cut-off cone-shaped pyramids). However, it should be noted that while perfect cones and pyramids may be difficult to manufacture, some rounding may be acceptable. The height of the micro-array structures are restricted by the fabrication process for making the surface relief master. The micro-arrays structure can be imprinted on an optical substrate using a master. While FIGS. 8A and 8B illustrate two examples of individual frustums and array organization, it will be understood that many variations on the design and fabrication of individual frustums and their arrangement in an array are possible, although some implementations may be easier to fabricate.

Figure 9A:
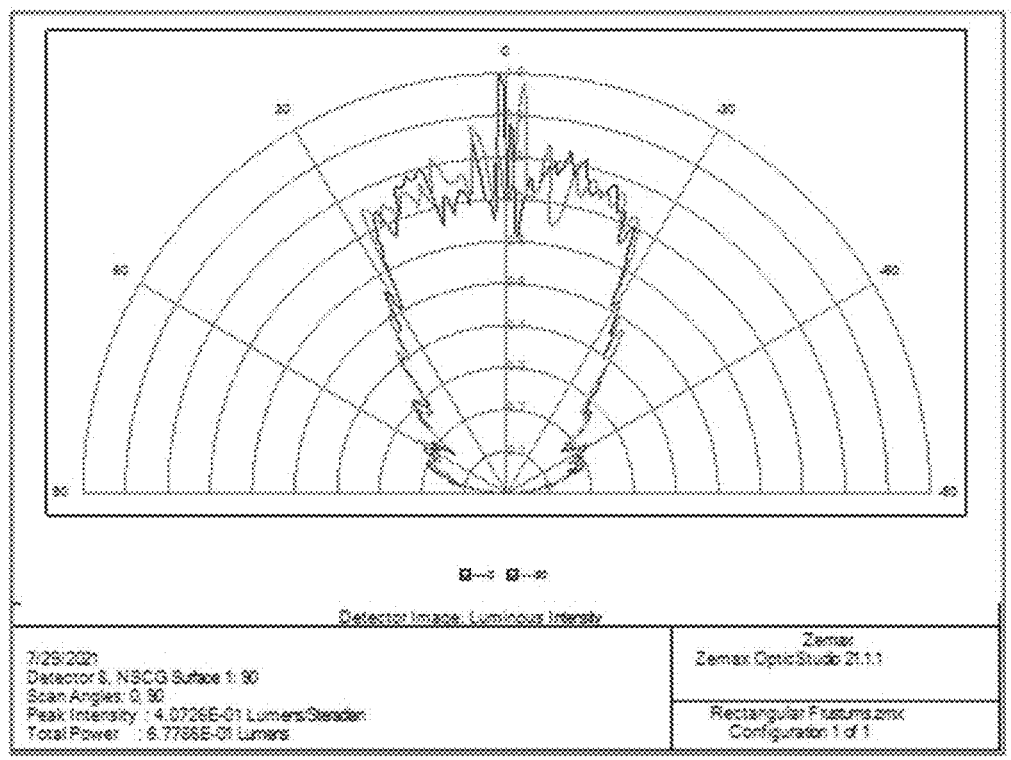
FIG. 9A illustrates the angular distribution of light output from micro-frustum array of FIG. 8A.
Figure 9B:
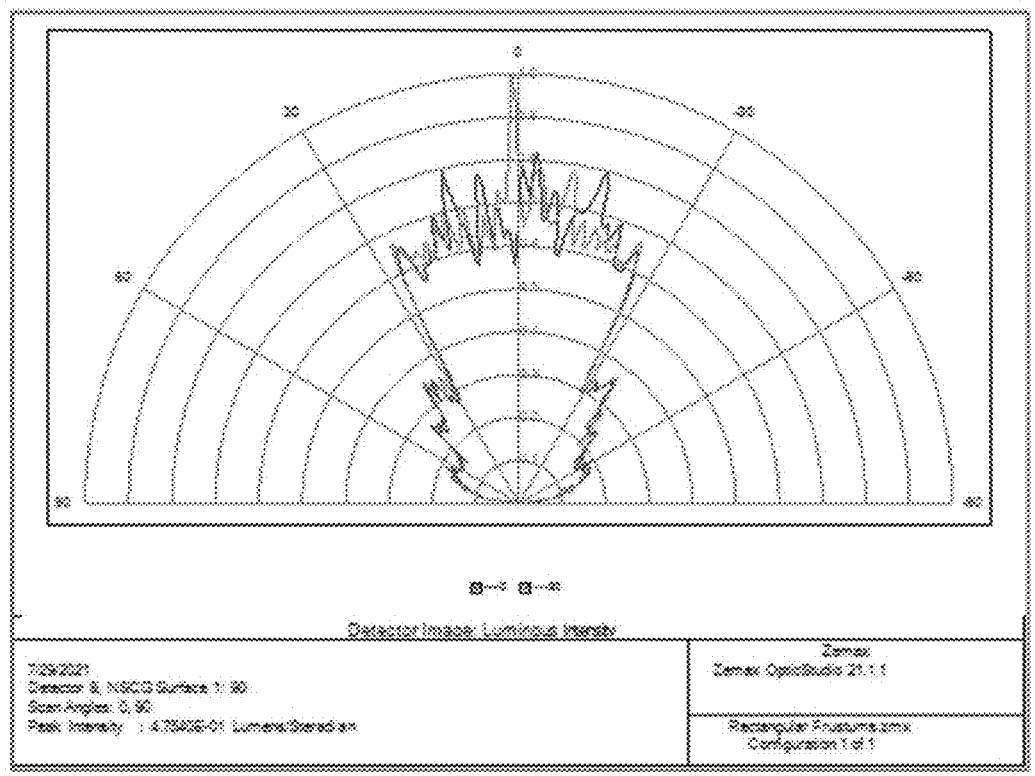
FIG. 9B illustrates the angular distribution of light output from micro-frustum array of FIG. 8B.

FIG. 9A illustrates the light output through an array of frustums, showing the angular distribution. FIG. 9B shows the light output through an array of pyramids., showing the angular distribution. These are illustrative examples showing how variations in microstructure design and manufacture result in changes in the optical response of an AGF.

The height of the micro-array structures are restricted by the fabrication process for making the surface relief master. The micro-arrays structure can be imprinted on an optical substrate using a mastering process.

Figure 10A:
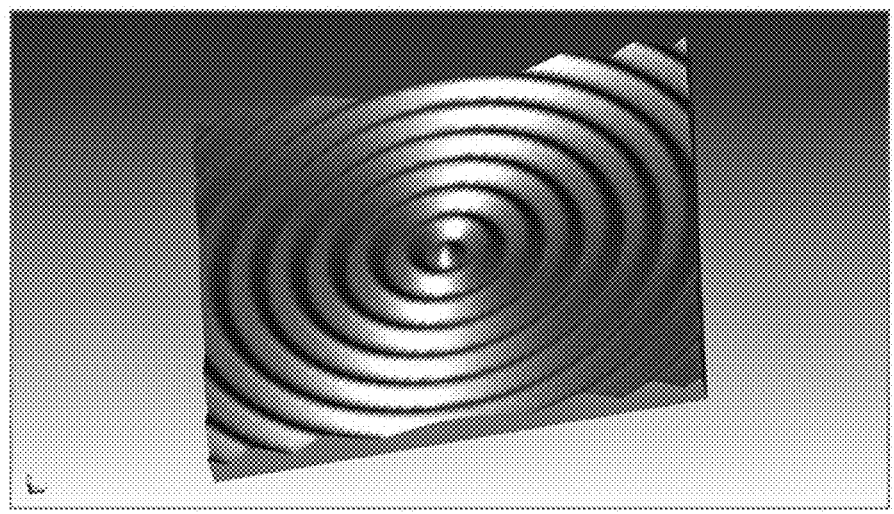
FIG. 10A illustrates a concentric set of rings of trapezoidal cross section about a center conical pyramidal region to form frustum rings.
Figure 10B:
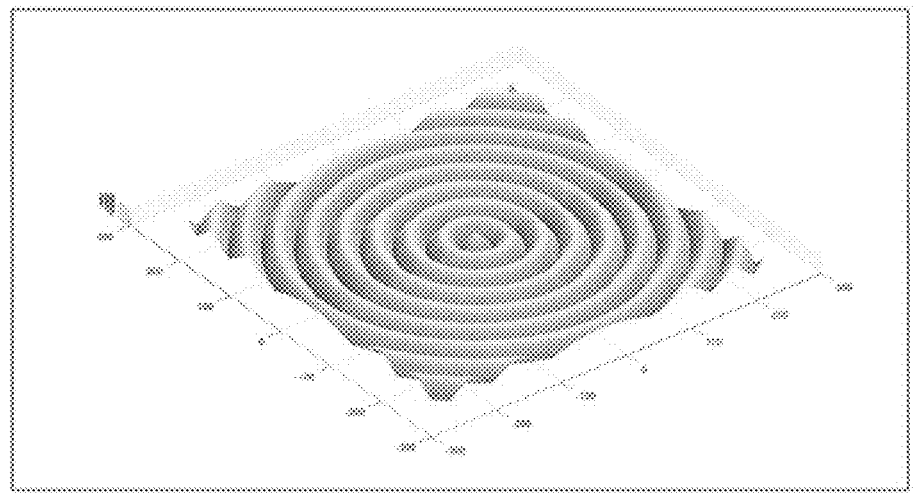
FIG. 10B illustrates a depth profile for the frustum rings of FIG. 10A
Figure 10C:
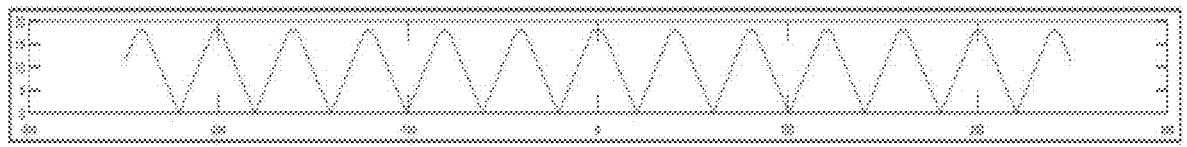
FIG. 10C illustrates a portion of a cross-section.

In one embodiment, the AGF is a geometrical entity with a central frustum and a set of concentric rings with trapezoidal profile which we will call frustum rings. FIGS. 10A and 10B show a center frustum with rings which have a trapezoidal profile. FIG. 10C shows the slice profile from the structure, illustrating that each ring may have a trapezoidal cross-section with sloped sidewalls. A sequence of frustum rings can be designed with a depth, sidewall slope, base dimension, refractive indices, and height dimension that can be analyzed by a ray tracing algorithm to identify a combination of parameters to reduce the angular distribution of output light. Empirical studies may also be used to optimize the design.

This design of an AGF has a number of manufacturing advantages. A fabrication advantage arrives when making lens zones into rings, namely the fabrication depth is easier to achieve with gray scale lithography. The advantages of using this type of profile, rather than a Fresnel version of a frustum, is that the need for steep walls are eliminated, which usually cause uncontrolled light direction in a practical fabricated element. Walls are very difficult to make perfectly vertical in fabrication. This is a scattering device, which makes the direction of light spatially invariant, whereas a Fresnel lens is necessary for spatially specific refraction direction. The aforementioned rings can also be elliptically configured if the distribution of light needs to be elliptically configured.

Figure 11:
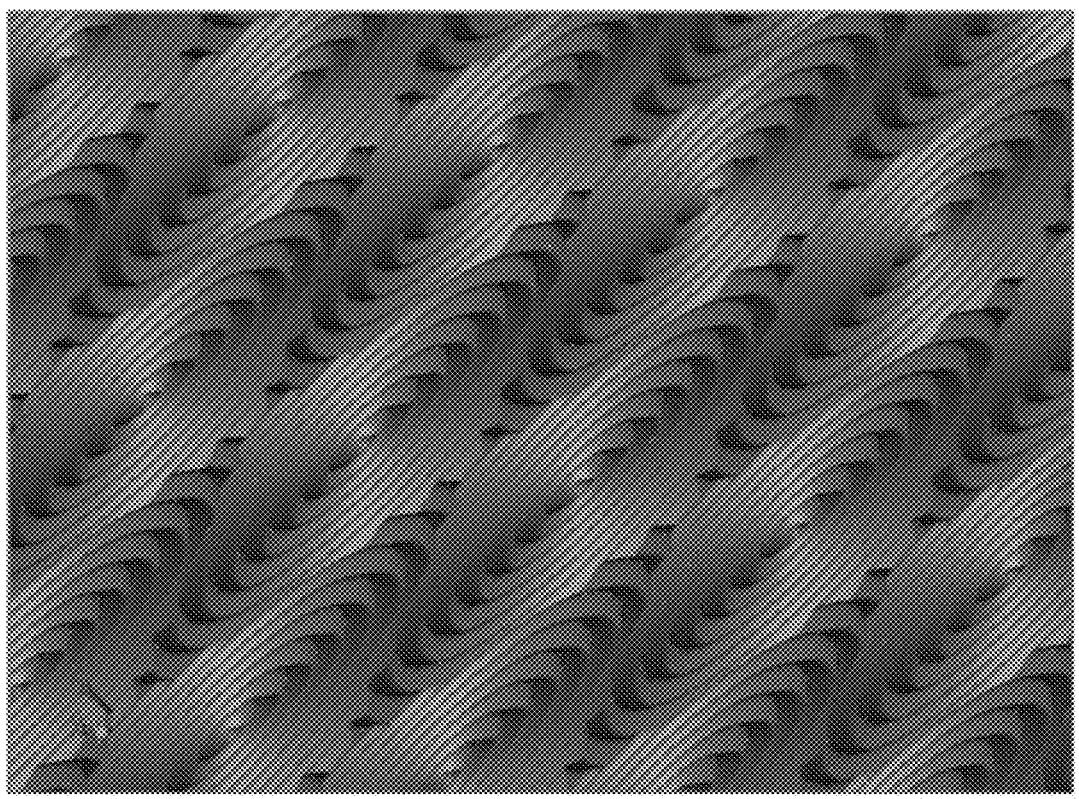
FIG. 11 illustrates an array of frustum rings.

Arrays of the frustum rings may also be formed. The frustum rings can be arranged into an array to cover a large surface area. The arrays can be rectangular, square, hexagonal or asymmetrical hexagonal patterned. FIG. 11 shows an array of frustum rings.

The cross section of the rings do not have to have a perfectly flat plateau with a perfect geometric shape. Some profiles can have a rounded section due to the fabrication process. Even the pointed sections on the bottoms and base of the trapezoids can have some rounding caused by fabrication.

Figure 12A:
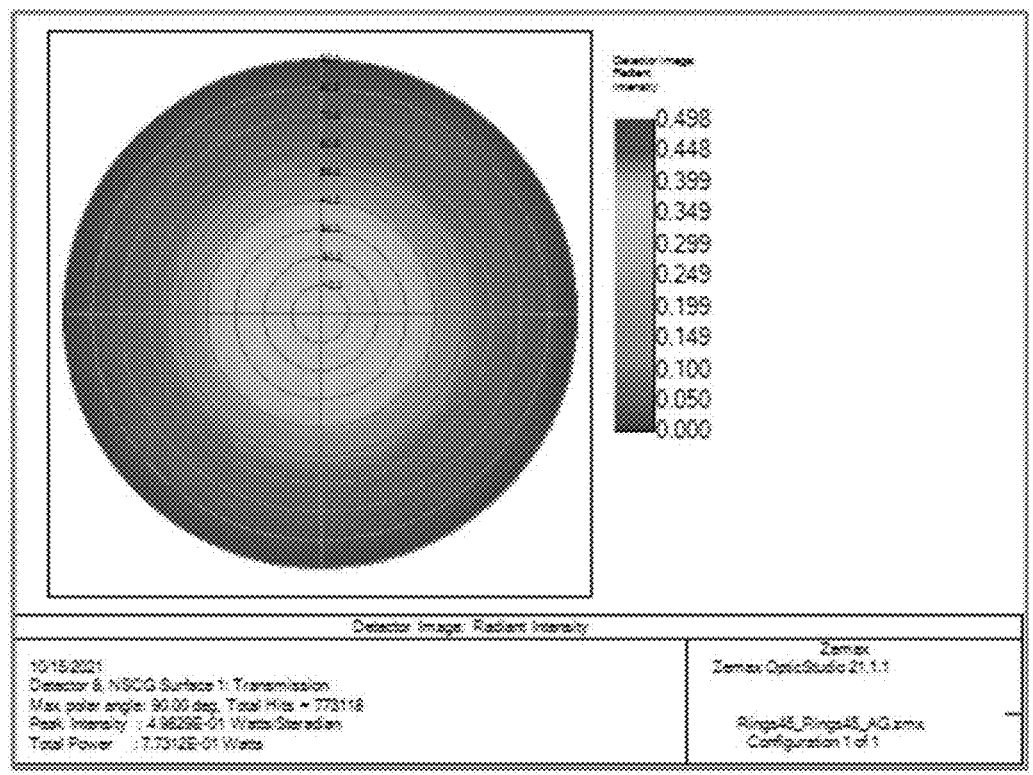
FIG. 12A illustrates a two dimensional intensity plot of the light output of the frustum rings.
Figure 12B:
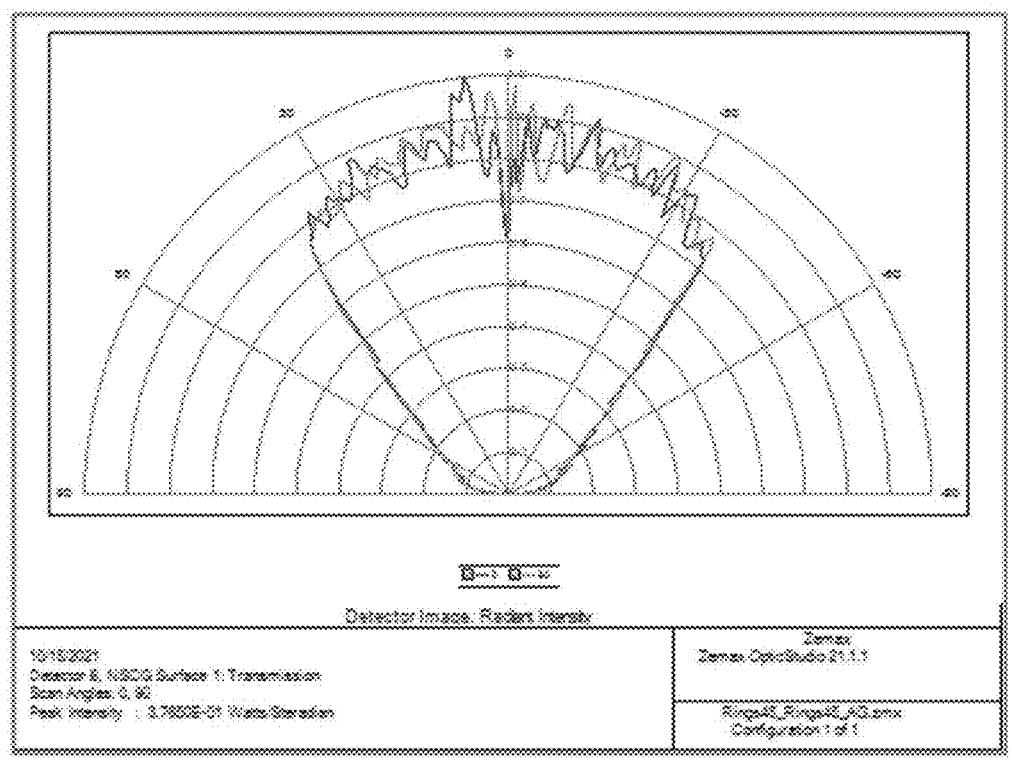
FIG. 12B illustrates an angular polar plot of the light output of the frustum rings.

FIG. 12A illustrates radiant intensity versus polar angle, illustrating a fairly rotationally symmetric bidirectional scatter distribution function. FIG. 12B illustrates the angular distribution in polar format. The frustum rings tend to take on a rotationally symmetric BSDF distribution compared to the rectangular or square array of frusta of pyramids or cones.

The output BSDF of the frustum rings produces a fairly rotationally symmetric distribution with a sharp reduction at higher angles. For example, at 60 degrees, the intensity is down to 0.2 of maximum. There is very little energy at higher angles.

A LSD can be added to the film to add some randomness to the output and provide benefits such as increased homogeneity.

Figure 13A:
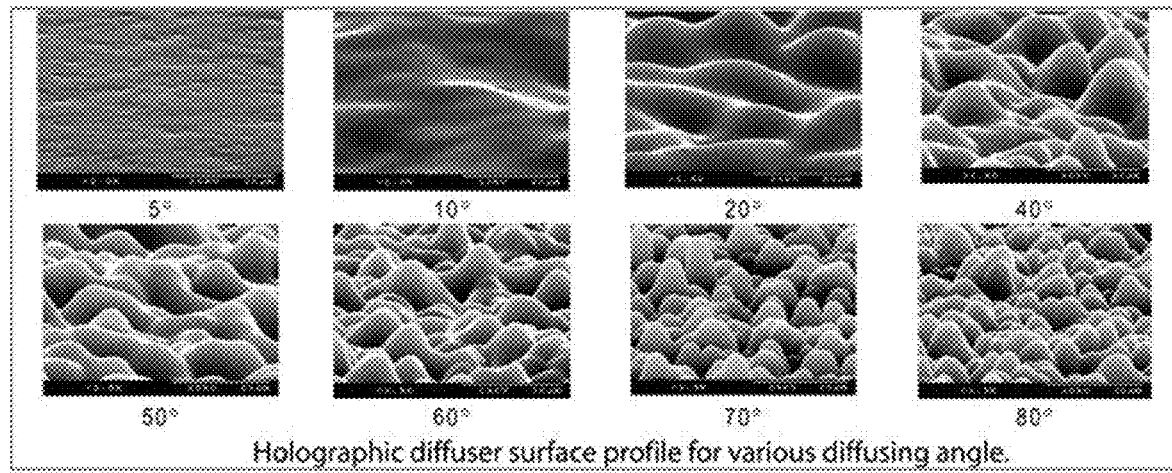
FIG. 13A illustrates a scanning electron microscopy (SEM) image of a light shaping diffuser.
Figure 13B:
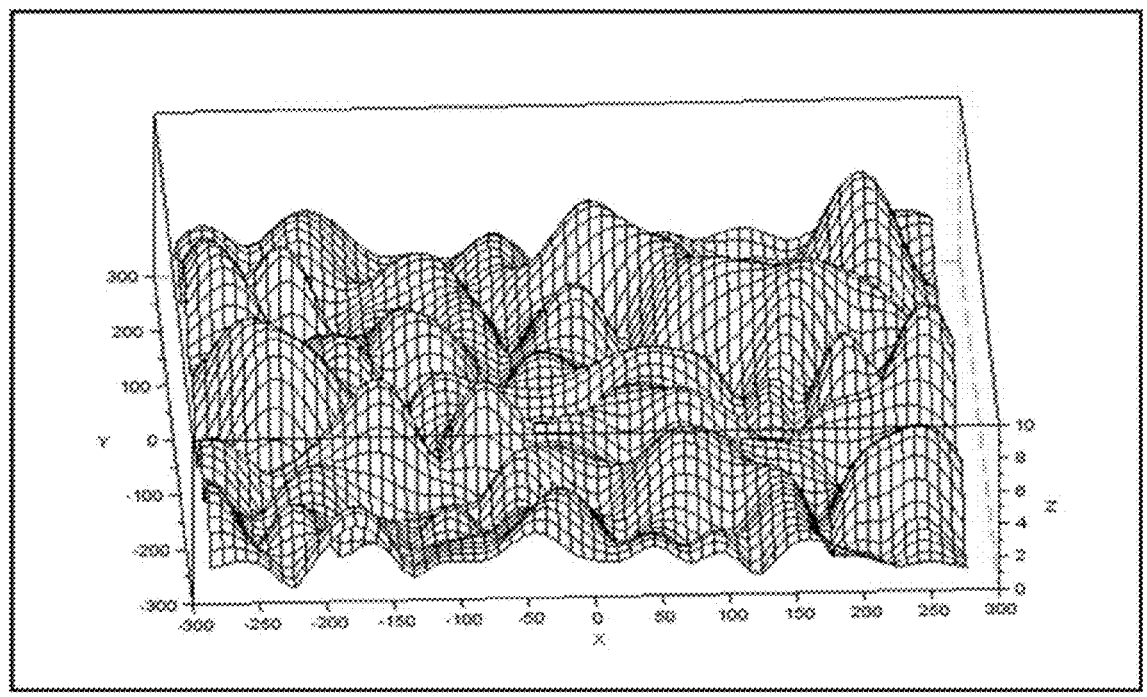
FIG. 13B illustrates a computer wire-frame of a light shaping diffuser.
Figure 13C:
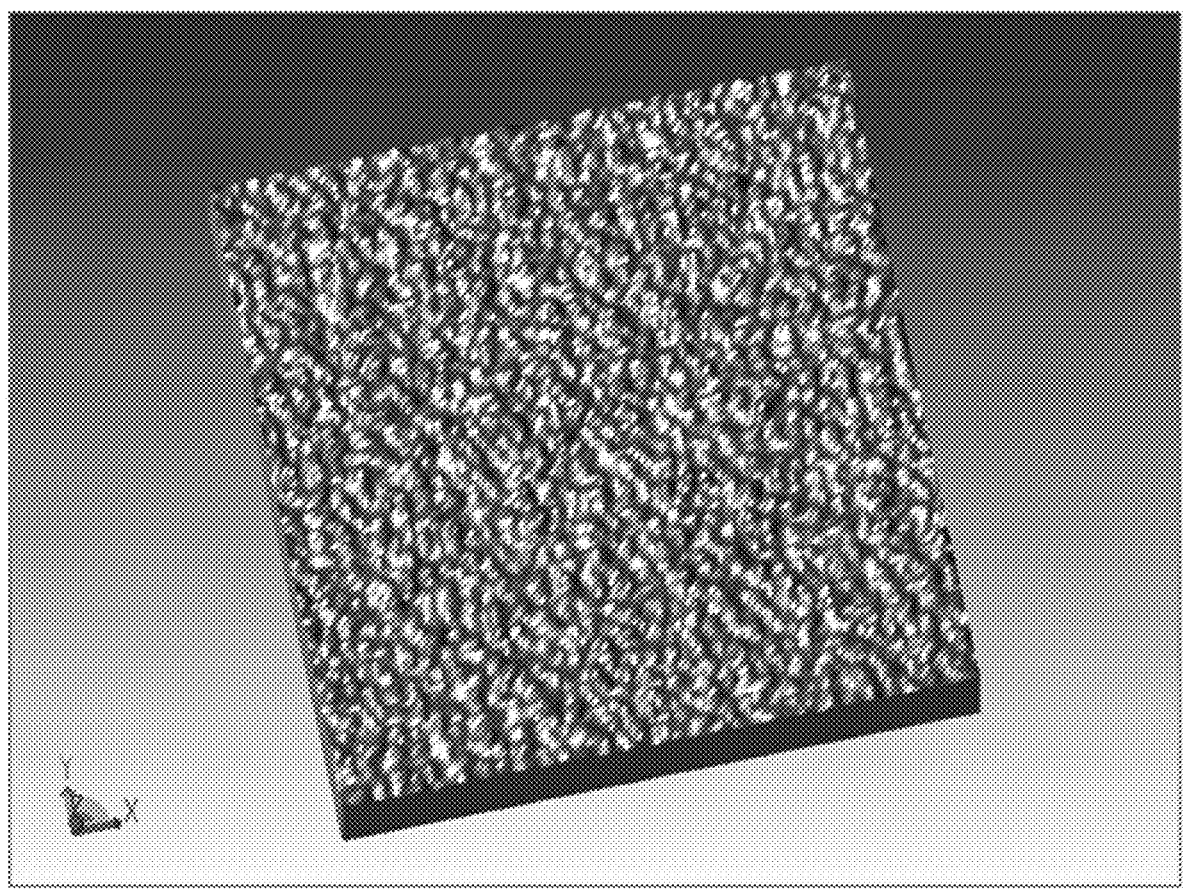
FIG. 13C illustrates a computer rendered image of a light shaping diffuser.

FIGS. 13A, 13B and 13C illustrate Light Shaping Diffuser (LSD) surface SEM (FIG. 13A), computer wire-frame (FIG. 13B) and computer rendered (FIG. 13C).

In a lighting fixture, the Anti-Glare surface which contains the array of frusta is on the side opposite (second side) of the light source. The LSD can be applied independent to the AG surface on the first side facing the light source. Alternatively, the LSD function can be applied to the AG surface by adding the depth of an LSD function to the AG surface. This would make the surface shape of each frustum different to each other.

One advantage of the AGF is that it is highly manufacturable. Frusta formed in the master/tool reduces the necessity of forming a sharp tip. When micro elements are formed, the flat part of the geometry can be formed deeper into the structure. Since optical beams of lithography tools are less focused deeper into the structure it is easier to form blunt sections rather than sharp points. The ringed trapezoids in frustum rings helps form BSDF patterns which are more rotationally symmetric than the frustum of pyramids and cones. Adding the LSD function avoids any commonality to geometries from other inventions.

As other examples of a fabrication process, the frustums may be first patterned in photoresist using a Direct-Write-Laser (DWL) technique. The thickness of the photoresist is precisely and uniformly controlled to match the heights of the frustums that are patterned all the way down to the substrate. In one embodiment, the tops of the frustums are defined by the exposed substrate that the photopolymer is on. This provides a smooth and well-defined top for the frustums and all the frustums are then coplanar with each other. The DWL toolset uses a rastering laser beam to expose the entire depth of the resist in one or several passes. Other conventional photolithographic techniques, such as Photomask aligners and/or steppers and scanners can also be used to make these structures using contact or proximity lithography. The desired frustum angles can be achieved by imaging in grayscale or by tuning the lithographic process, such as the exposure conditions.

A mold is then made using an electroforming process after depositing a seed layer on the frustums in resist. Alternatively, a room temperature vulcanized silicone can be used to replicate directly from the master. The frustums are then replicated into a transparent flexible or rigid plate using a mold transfer process.

In another embodiment, a method of fabricating a flexible or rigid substrate, which includes an array of microstructures or nanostructures on one side of the substrate comprises coating a substrate with a uniform thickness of photoresist polymer; which includes applying a rastering laser beam to develop and form a series of identical or non-identical microstructures or nanostructures wherein the microstructures or nanostructures comprise frustums or inverse frustums, and wherein the developed photoresist can be used to make molds, replicas, final parts, or mixtures thereof.

In another embodiment, a method of making a master includes obtaining a smooth, flat substrate, such as glass, placing a photoresist coating on one surface, exposing the photoresist coating to light in a frustum pattern and removing the exposed regions of the photoresist. Making a master can be done by a photolithography process, a mechanical process, such as diamond turning, or an e-beam etching process.

For a micro frustum array, the frustums can differ in shape from those illustrated. The frustum may be conical frustums, square frustums, pentagonal frustums, hexagonal frustums, octagonal frustums, n-gon (a polygon with n sides) frustums, rectangular frustums, diamond frustums, rhombus frustums, quadrilateral frustums, star frustums, donut frustums, irregular polygon frustums, frustums hollowed out by removing a central region of the frustum of a certain shape, or any combination thereof. The frustums can be an inverse surface relief of frustums or a mixture of frustums and inverse surface relief of frustums wherein the inverse surface relief structures have a lower index of refraction than the surrounding material.

A frustum is generally defined as any part of a geometric shape between two parallel planes such that many variations in frustum shape may be used. The size and depth of each frustum in a frustum array may vary. In some embodiments, the frustum base ranges from about 1 to 500 microns in width and the frustum top surface ranges from about 0.5 to 499 microns in width. Generally, the height of a frustum is between about 1 to 500 microns. In another embodiment, the frustums have a height to base aspect ratio of about 1:1, so that the height is similar to the base of the frustum. For an individual frustum, the base of the frustum is wider than the top of the frustum.

Similarly, many variations in the size and depth of frustum rings are contemplated.

As discussed in the above example and illustrated in the FIGS., the intensity of light at angles in the range of 60 to 85 degrees is greatly reduced. As illustrated by FIGS., at an angle of ±60 degrees, the intensity is reduced by more than a factor of 2. In some cases by a factor or 3 or 4. However, more particularly, there is a sharp angular cut off of the light output and large reduction in the integrated intensity of light over a range of angles over which glare is a potential issue.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

What is claimed is:

1. A lighting system, comprising:
a transparent film having a first side and an opposed second side, the first side configured to receive light from an overhead illumination light source having a Lambertian distribution and the second opposed side patterned with frustums designed to narrow the angular distribution of light output from the transparent film in order to reduce glare; and
wherein the frustums reduce an intensity of light at ±60 degrees by at least a factor of 4 compared with a Lambertian distribution.

2. The lighting system of claim 1 wherein the frustums comprise an array of pyramidal frustums.

3. The lighting system of claim 1, wherein the frustums comprise an array of conical frustums.

4. The lighting system of claim 1 where the frustums comprise concentric rings having a trapezoidal cross-section.

5. The lighting system of claim 1, wherein the first side of the transparent film comprises a light shaping diffuser.

6. The lighting system of claim 1, where the second side of the transparent film is patterned to implement a light shaping diffuser, wherein the geometric heights of the frustums and light shaping diffuser are added together to form a surface relief pattern.

7. The lighting system of claim 1, wherein the overhead illumination light source is an LED light source.

8. A lighting system, comprising:
a transparent film having a first side to receive light from an LED illumination light source and an opposed second side with a micro frustum array to narrow a bidirectional scatter distribution from the LED illumination light source to a narrower optical distribution to reduce glare;
one of the first or second side patterned with a light shaping diffuser (LSD); and
wherein the micro frustum array reduces an intensity of light at ±60 degrees by at least a factor of 4 compared with a Lambertian distribution.

9. The lighting system of claim 8, wherein the first side is patterned with the LSD.

10. The lighting system of claim 8 wherein the second side is patterned with the LSD.

11. The lighting system of claim 8, wherein the LSD is configured to improve optical homogeneity.

12. The lighting system of claim 8, wherein the LSD comprises a surface relief structure including pseudo-random, non-periodic structures.

13. An overhead lighting system, comprising:
a Light Emitting Diode (LED) light source having an output with a Lambertian distribution;
a transparent film having a first side facing the LED light source and an opposed second side;
the second side patterned with a surface microstructure designed to narrow a bidirectional scatter distribution from the LED light source into a narrower optical distribution to reduce glare; and
wherein the surface microstructure reduces an intensity of light at ±60 degrees by at least a factor of 4 compared with a Lambertian distribution.

14. The overhead lighting system of claim 13, wherein the surface microstructure comprises a micro frustum array.

15. The overhead lighting system of claim 13, wherein the surface microstructure comprises a set of concentric rings each having a trapezoidal cross section.

16. The overhead lighting system of claim 13, wherein the first side is patterned with a light shaping diffuser (LSD) to perform at least one light shaping function on the light received from the LED light source.

* * * * *